United States Patent
Otsuki et al.

(10) Patent No.: US 10,985,371 B2
(45) Date of Patent: Apr. 20, 2021

(54) NEGATIVE ELECTRODE ACTIVE MATERIAL LAYER WITH CONTROLLED REFLECTANCE AND LITHIUM ION SECONDARY BATTERY

(71) Applicant: TDK CORPORATION, Tokyo (JP)

(72) Inventors: Keitaro Otsuki, Tokyo (JP); Tetsu Sato, Tokyo (JP); Masahiro Saegusa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 106 days.

(21) Appl. No.: 16/295,852

(22) Filed: Mar. 7, 2019

(65) Prior Publication Data
US 2019/0280297 A1 Sep. 12, 2019

(30) Foreign Application Priority Data

Mar. 12, 2018 (JP) .............................. JP2018-044310
Dec. 25, 2018 (JP) .............................. JP2018-241198

(51) Int. Cl.
*H01M 4/583* (2010.01)
*H01M 4/133* (2010.01)
*H01M 10/0525* (2010.01)
*H01M 10/0569* (2010.01)
*H01M 4/02* (2006.01)

(52) U.S. Cl.
CPC .......... *H01M 4/583* (2013.01); *H01M 4/133* (2013.01); *H01M 10/0525* (2013.01); *H01M 10/0569* (2013.01); *H01M 2004/021* (2013.01); *H01M 2004/027* (2013.01)

(58) Field of Classification Search
CPC .. H01M 4/583; H01M 4/133; H01M 10/0525; H01M 10/0569
USPC ....................................................... 429/231.8
See application file for complete search history.

(56) References Cited

U.S. PATENT DOCUMENTS

| | | | |
|---|---|---|---|
| 2008/0318130 A1* | 12/2008 | Ogawa ................ | H01M 4/1391 429/231.95 |
| 2009/0280413 A1 | 11/2009 | Ohta et al. | |
| 2011/0262802 A1 | 10/2011 | Uono et al. | |
| 2014/0255796 A1* | 9/2014 | Matsuoka ........... | H01M 10/446 429/339 |

FOREIGN PATENT DOCUMENTS

| JP | 2008059903 A | | 3/2008 |
|---|---|---|---|
| JP | 2009059676 A | | 3/2009 |
| JP | 2010135314 A | | 6/2010 |
| JP | 2017068915 A | * | 4/2017 |

* cited by examiner

*Primary Examiner* — Sean P Cullen
(74) *Attorney, Agent, or Firm* — Oliff PLC

(57) ABSTRACT

A negative electrode includes a negative electrode current collector and a negative electrode active material layer that is provided on the negative electrode current collector and includes a negative electrode active material. The negative electrode active material includes a carbon material, and a surface of the negative electrode active material layer has a reflectance Ra in a range of $7.0 \leq Ra \leq 14.8\%$ at a wavelength of 550 nm. A lithium ion secondary battery includes the negative electrode, a positive electrode, a separator, and a nonaqueous electrolyte solution. The nonaqueous electrolyte solution includes a nonaqueous solvent and an electrolyte, the nonaqueous solvent contains ethylene carbonate, and the ethylene carbonate is contained in a range of 10 to 30 vol. % in the entire nonaqueous solvent.

7 Claims, 1 Drawing Sheet

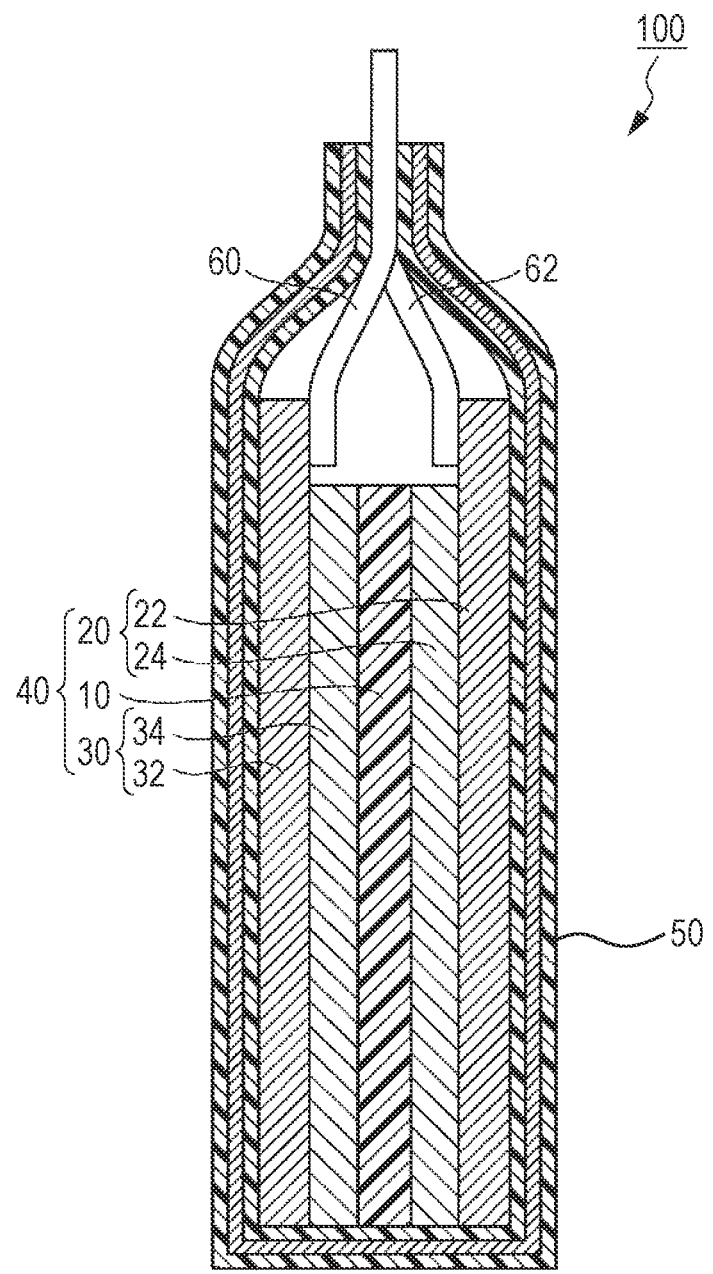

NEGATIVE ELECTRODE ACTIVE MATERIAL LAYER WITH CONTROLLED REFLECTANCE AND LITHIUM ION SECONDARY BATTERY

CROSS-REFERENCE TO RELATED APPLICATION

This application claims priority from Japanese Patent Application Nos. 2018-044310 filed on Mar. 12, 2018, and 2018-241198 filed on Dec. 25, 2018, with the Japan Patent Office, the entire contents of which are hereby incorporated by reference.

BACKGROUND ART

1. Technical Field

The present disclosure relates to a negative electrode and a lithium ion secondary battery.

2. Related Art

Lithium ion secondary batteries have smaller weight and higher capacity than nickel-cadmium batteries, nickel-hydrogen batteries, and the like, and therefore have been widely used as a power source for mobile electronic devices. In addition, the lithium ion secondary battery has been a strong candidate as a power source to be mounted in a hybrid vehicle and an electric vehicle. As the recent mobile electronic devices have been reduced in size and increased in functions, the lithium ion secondary battery to be used as the power source for such devices has been expected to have much higher capacity.

The capacity of the lithium ion secondary battery mainly depends on an active material of an electrode. Various kinds of negative electrode active materials have been suggested. Because of having high capacity, being superior in flatness of discharging potential, and so on, graphite carbon materials such as natural graphite, synthetic graphite obtained by graphitizing cokes or the like, graphitized mesophase pitch, and graphitized carbon fiber have been used.

To deal with the full-scale spread of hybrid vehicles and the novel applications including power tools, not just the increase in capacity but also the rapid discharging has recently been demanded more (see JP-A-2010-135314, JP-A-2009-59676, and JP-A-2008-59903).

SUMMARY

A negative electrode includes a negative electrode current collector and a negative electrode active material layer that is provided on the negative electrode current collector and includes a negative electrode active material. The negative electrode active material includes a carbon material, and a surface of the negative electrode active material layer has a reflectance Ra in a range of $7.0 \leq Ra \leq 14.8\%$ at a wavelength of 550 nm.

BRIEF DESCRIPTION OF THE DRAWINGS

The FIGURE is a schematic cross-sectional view of a lithium ion secondary battery according to one embodiment.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Negative electrode active materials that are described in JP-A-2010-135314, JP-A-2009-59676, and JP-A-2008-59903, however, do not have enough discharging capacity or rapid charging characteristic.

One object of the present disclosure is to provide a negative electrode and a lithium ion secondary battery with an excellent rapid charging characteristic.

As a result of earnest examinations, the present inventors have found out that the high rapid charging characteristic can be obtained by the use of a negative electrode including a negative electrode current collector, and a negative electrode active material layer that is provided on the negative electrode current collector and that includes a particular negative electrode active material, in which a reflectance Ra of a surface of the negative electrode active material layer at a wavelength of 550 nm is in a predetermined range.

That is, a negative electrode according to a first aspect includes a negative electrode current collector and a negative electrode active material layer that is provided on the negative electrode current collector and includes a negative electrode active material. The negative electrode active material includes a carbon material, and a surface of the negative electrode active material layer has a reflectance Ra in a range of $7.0 \leq Ra \leq 14.8\%$ at a wavelength of 550 nm.

By adjusting the reflectance Ra of the surface of the negative electrode active material to be within the predetermined range, the rapid charging characteristic is improved. Although the mechanism is unclear, it is supposed that the reflectance Ra of the surface of the negative electrode active material layer reflects the flatness of the surface of the negative electrode active material layer and the surface compressed state of the negative electrode active material on the surface of the negative electrode active material layer.

That is to say, it is estimated that when the reaction field with the electrolyte solution on the surface of the negative electrode active material layer is increased and the surface of the negative electrode active material on the surface of the negative electrode active material layer is compressed, excessive impregnation of the surface of the negative electrode active material with the electrolyte solution is suppressed and the high reactivity and side reaction are both suppressed; thus, the high rapid charging characteristic is achieved.

In addition, it is considered that the rapid charging characteristic is similarly improved when the reflectance Ra of the surface of the negative electrode active material layer is controlled to be within the predetermined range independently of the surface compressed state of the negative electrode active material layer.

Regarding this point, it is considered that when the reflectance Ra of the surface of the negative electrode active material layer is within the predetermined range, the side reaction on the surface of the negative electrode active material layer is suppressed and the permeability of the electrolyte solution into the negative electrode active material layer from the surface of the negative electrode active material layer is improved, and therefore the rapid charging characteristic is improved.

In the negative electrode according to the above aspect, the negative electrode active material layer may have a density da in the range of $1.35 \leq da \leq 1.62$ g/cm$^3$.

In the negative electrode according to the above aspect, the negative electrode active material layer may have a supporting quantity La per unit area in the range of $7.8 \leq La \leq 12.5$ mg/cm$^2$.

In the negative electrode according to the above aspect, the negative electrode active material layer may have a porosity Pa in the range of $26.5 \leq Pa \leq 31.3\%$.

In the negative electrode according to the above aspect, the negative electrode active material may contain a carbon material with a graphite structure.

The negative electrode with the reflectance in the above range has the particularly excellent rapid charging characteristic when the negative electrode active material includes the carbon material with the graphite structure. It is estimated that this is because the carbon material with the graphite structure does not excessively decrease the deintercalation and intercalation sites for lithium ions on the surface of the negative electrode active material layer and thus, both the impregnation with the electrolyte solution and the suppression of the side reaction are achieved.

A lithium ion secondary battery according to a second aspect may include the negative electrode according to the above aspect, a positive electrode, a separator, and a nonaqueous electrolyte solution. The nonaqueous electrolyte solution may include a nonaqueous solvent and an electrolyte. The nonaqueous solvent may contain ethylene carbonate. The ethylene carbonate may be contained in the range of 10 to 30 vol. % in the entire nonaqueous solvent.

When the negative electrode with the reflectance in the above range is combined with the electrolyte solution in which the ethylene carbonate is contained in the range of 10 to 30 vol. %, the high rapid charging characteristic can be achieved. It is estimated that this is because ethylene carbonate, which is partially decomposed on the surface of the electrode to become a film component, is not decomposed excessively and the excellent film can be formed.

In the lithium ion secondary battery according to the second aspect, the nonaqueous solvent may contain propylene carbonate. The propylene carbonate may be contained in the range of 10 to 20 vol. % in the entire nonaqueous solvent. The ratio of a content Le of the ethylene carbonate to a content Lp of the propylene carbonate, Le/Lp, may be in the range of $1.0 \leq Le/Lp \leq 3.0$.

When the positive electrode and the negative electrode with the reflectance in the above range are combined with the electrolyte solution in which propylene carbonate is contained in the range of 10 to 20 vol. % and the ratio of the content Le of the ethylene carbonate to the content Lp of the propylene carbonate, Le/Lp, is in the range of $1.0 \leq Le/Lp \leq 3.0$, the high rapid charging characteristic can be achieved.

In this manner, according to the first aspect and the second aspect, the negative electrode that can improve the rapid charging characteristic and the lithium ion secondary battery including this negative electrode can be provided.

The present embodiment will hereinafter be described in detail with reference to the drawings. For the convenience, the drawings to be used in the following description may magnify a characteristic part in order to clarify the characteristic in the present disclosure. Therefore, the size, the ratio, and the like of the elements in these drawings may be different from the actual ones. The materials, the size, and the like shown in the description are mere examples, and the technique according to the present disclosure is not limited to these examples. Within the range that does not depart from the concept, various changes are possible.

(Lithium Ion Secondary Battery)

The FIGURE is a schematic cross-sectional view of a lithium ion secondary battery according to the present embodiment. A lithium ion secondary battery 100 illustrated in the FIGURE mainly includes a stacked body 40, a package 50 that houses the stacked body 40 in a sealed state, and a pair of leads 60 and 62 that is connected to the stacked body 40. In addition, a nonaqueous electrolyte that is not shown is housed in the package 50 with the stacked body 40.

The stacked body 40 includes a positive electrode 20 and a negative electrode 30 that are disposed to face each other with the separator 10 interposed therebetween. The positive electrode 20 includes a positive electrode current collector 22 with a plate shape (film shape) and a positive electrode active material layer 24 that is provided on the positive electrode current collector 22. The negative electrode 30 includes a negative electrode current collector 32 with a plate shape (film shape) and a negative electrode active material layer 34 that is provided on the negative electrode current collector 32.

The positive electrode active material layer 24 is in contact with one side of the separator 10 and the negative electrode active material layer 34 is in contact with the other side of the separator 10. The positive electrode current collector 22 has its end connected to the lead 62, and the negative electrode current collector 32 has its end connected to the lead 60. The leads 60 and 62 have their ends extended out of the package 50. In the example illustrated in the FIGURE, one stacked body 40 is provided in the package 50; however, a plurality of stacked bodies may be provided alternatively.

(Positive Electrode)

The positive electrode 20 includes the positive electrode current collector 22, and the positive electrode active material layer 24 that is provided on the positive electrode current collector 22.

The positive electrode according to the present embodiment includes the positive electrode current collector, and the positive electrode active material layer that is provided on the positive electrode current collector and that includes the positive electrode active material.

The positive electrode active material layer according to the present embodiment may be any general positive electrode active material that has conventionally been used. The electrode density dc of the positive electrode active material layer, the supporting quantity Lc of the positive electrode active material layer per unit area, the porosity Pc of the positive electrode active material layer, and the like can be adjusted as appropriate in accordance with the positive electrode active material to be used.

(Positive Electrode Active Material)

The positive electrode active material according to the present embodiment is not limited to a particular material. Examples of the positive electrode active material include the existing positive electrode active material as typified by lithium-containing transition metal oxide that contains Ni, Mn, and Co as main components, such as LiCoO$_2$, LiNi$_{1/3}$Mn$_{1/3}$Co$_{1/3}$O$_2$, and LiNi$_{0.2}$Co$_{0.8}$O$_2$.

Among these materials, it is preferable to use lithium-containing transition metal oxide mainly containing Co or Ni as the transition metal, such as LiCoO$_2$, LiNi$_{0.8}$Co$_{0.2}$O$_2$, and LiNi$_{0.8}$Co$_{0.1}$Mn$_{0.1}$O$_2$, as the positive electrode active material.

Note that the positive electrode active material according to the present embodiment does not need to have the oxygen quantity of the stoichiometric composition of the existing compound, and widely includes materials with oxygen deficiency. That is to say, the positive electrode active material according to the present embodiment also includes materials that are identified to have the same composition system by X-ray diffraction or the like.

Therefore, the positive electrode active material according to the present embodiment may be a material in which a part of Ni or Co in the existing positive electrode active material is substituted for another element. The concentration gradient of the element may exist in the positive electrode active material, or at least a part of a surface of the positive electrode active material may be covered with oxide, carbon, or the like.

The positive electrode active material layer according to the present embodiment may contain a plurality of positive electrode active materials with different compositions.

The positive electrode active materials with the compositions different from that of the positive electrode active material described above include lithium nickelate ($LiNiO_2$), lithium manganate ($LiMnO_2$), lithium manganese spinel ($LiMn_2O_4$), and composite metal oxide expressed by general formula $LiNi_xCo_yM_zO_2$ ($x+y+z=1$, $0.5 \leq x \leq 1$, $0 \leq y \leq 1$, $0 \leq z \leq 1$, and M is one or more kinds of elements selected from Al, Mg, Nb, Ti, Cu, Zn, and Cr). In addition, the positive electrode active materials with the different compositions include composite metal oxide such as a lithium vanadium compound ($LiVOPO_4$, $Li_3V_2(PO_4)_3$, $LiV_2O_5$, $Li_2VP_2O_7$), olivine type $LiMPO_4$ (where M is one or more kinds of elements selected from Co, Ni, Mn, Fe, Mg, Nb, Ti, Al, Zr, and V), and lithium titanate ($Li_4Ti_5O_{12}$). Furthermore, the positive electrode active materials with the different compositions include the existing positive electrode active material that can intercalate and deintercalate lithium ions, such as polyacetylene, polyaniline, polypyrrole, polythiophene, and polyacene.

The positive electrode active material layer according to the present embodiment may include members such as a conductive auxiliary agent and a binder in addition to the positive electrode active material.

(Conductive Auxiliary Agent)

Examples of the conductive auxiliary agent include carbon powder of carbon blacks and the like, carbon nanotube, carbon materials, micropowder of metal such as copper, nickel, stainless steel, and iron, a mixture of a carbon material and metal micropowder, and conductive oxide such as ITO.

(Binder)

The binder binds the active materials together, and binds the active material and the positive electrode current collector 22 to each other. The binder may be any binder that enables the above-described binding. Examples of the binder include fluorine resin. Examples of the fluorine resin include polyvinylidene fluoride (PVDF), polytetrafluoroethylene (PTFE), tetrafluoroethylene-hexafluoropropylene copolymer (FEP), tetrafluoroethylene-perfluoroalkylvinylether copolymer (PFA), ethylene-tetrafluoroethylene copolymer (ETFE), polychlorotrifluoroethylene (PCTFE), ethylene-chlorotrifluoroethylene copolymer (ECTFE), and polyvinyl fluoride (PVF).

Another example of the binder is fluorine rubber including vinylidene fluoride. Examples of the fluorine rubber including vinylidene fluoride include vinylidene fluoride-hexafluoropropylene fluorine rubber (VDF-HFP fluorine rubber), vinylidene fluoride-hexafluoropropylene-tetrafluoroethylene fluorine rubber (VDF-HFPTFE fluorine rubber), vinylidene fluoride-pentafluoropropylene fluorine rubber (VDF-PFP fluorine rubber), vinylidene fluoride-pentafluoropropylene-tetrafluoroethylene fluorine rubber (VDF-PFP-TFE fluorine rubber), vinylidene fluoride-perfluoromethylvinylether-tetrafluoroethylene fluorine rubber (VDF-PFMVE-TFE fluorine rubber), and vinylidene fluoride-chlorotrifluoroethylene fluorine rubber (VDF-CTFE fluorine rubber).

The binder may be formed of conductive polymer with electronic conductivity and conductive polymer with ionic conductivity. An example of the conductive polymer with the electronic conductivity is polyacetylene. In this case, the binder exhibits the function of the conductive material; therefore, it is unnecessary to add the conductive material. An example of the conductive polymer with the ionic conductivity is obtained by combining alkali metal salt, which contains lithium salt or lithium mainly, with a polymer compound such as polyethylene oxide and polypropylene oxide.

The content of the positive electrode active material, the conductive material, and the binder in the positive electrode active material layer 24 is not limited in particular. The constituent ratio of the positive electrode active material in the positive electrode active material layer 24 is preferably 90.0% or more and 98.0% or less in mass ratio. In addition, the constituent ratio of the conductive material in the positive electrode active material layer 24 is preferably 1.0% or more and 3.0% or less in mass ratio. The constituent ratio of the binder in the positive electrode active material layer 24 is preferably 2.0% or more and 5.0% or less in mass ratio.

When the content of the positive electrode active material and the binder is in the above range, it is possible to suppress that the quantity of binder is too small to form the firm positive electrode active material layer. In addition, it is possible to suppress the tendency that the quantity of binder that does not contribute to the electric capacity increases so as to make it difficult to achieve enough volume energy density.

In addition, when the content of the positive electrode active material and the conductive material is in the above range, the sufficient electronic conductivity can be achieved in the positive electrode active material layer; thus, the high volume energy density and output characteristic can be achieved.

(Positive Electrode Current Collector)

The positive electrode current collector 22 may be any conductive plate material. Examples of the positive electrode current collector 22 include a metal thin plate of metal such as aluminum, copper, or nickel, and a thin plate of an alloy including any of these metals. Among these examples, the metal thin plate of aluminum, which is lightweight, is preferably used.

(Negative Electrode)

The negative electrode 30 includes the negative electrode current collector 32, and the negative electrode active material layer 34 that is provided on the negative electrode current collector 32.

The negative electrode according to the present embodiment includes the negative electrode current collector, and the negative electrode active material layer that is provided on the negative electrode current collector and that includes the negative electrode active material. The negative electrode active material includes a carbon material. The reflectance Ra of the surface of the negative electrode active material layer at a wavelength of 550 nm is preferably in the range of $7.0 \leq Ra \leq 14.8\%$.

By the use of the negative electrode according to the present embodiment, a high rapid charging characteristic can be achieved. It is considered that the reflectance Ra of the surface of the negative electrode active material layer reflects the flatness of the surface of the negative electrode active material layer, and the surface compressed state of the negative electrode active material on the surface of the negative electrode active material layer. It is estimated that the rapid charging characteristic of the lithium ion secondary battery is improved by the use of the negative electrode in which the reflectance Ra of the surface of the negative electrode active material layer is in the range of $7.0 \leq Ra \leq 14.8\%$.

In the negative electrode according to the present embodiment, the density da of the negative electrode active material layer is preferably in the range of $1.35 \leq da \leq 1.62$ g/cm$^3$, more preferably $1.40 \leq da \leq 1.60$ g/cm$^3$.

In the negative electrode according to the present embodiment, the supporting quantity La of the negative electrode active material layer per unit area is preferably in the range of $4.5 \leq La \leq 12.5$ mg/cm$^2$, more preferably $6.0 \leq La \leq 12.0$ mg/cm$^2$.

In the negative electrode according to the present embodiment, the porosity Pa of the negative electrode active material layer is preferably in the range of $26.5 \leq Pa \leq 31.3\%$, more preferably $26.0 \leq Pa \leq 31.0\%$.

In the negative electrode according to the present embodiment, it is more preferable that the density da of the negative electrode active material layer and the porosity Pa of the negative electrode active material layer satisfy the preferable range described above.

It is supposed that when da and Pa of the negative electrode active material layer satisfy the aforementioned preferable range, the excessive impregnation with the electrolyte solution, the high reactivity, and the side reaction are suppressed and moreover the effect of diffusing the electrolyte solution in the negative electrode active material layer is increased, so that the high rapid charging characteristic is achieved.

(Negative Electrode Active Material Layer)

The negative electrode active material layer 34 includes the negative electrode active material, and includes a conductive auxiliary agent and a binder as necessary.

(Negative Electrode Active Material)

As the material of the negative electrode active material, various known materials that have been used as the negative electrode active material for a lithium ion secondary battery can be used. Examples of the negative electrode active material include a carbon material such as graphite, hard carbon, soft carbon, or MCMB, silicon, a silicon-containing compound such as silicon oxide expressed by $SiO_x$ ($0<x<2$), and metal that forms alloy with metal lithium or lithium, and alloy thereof. As another material of the negative electrode active material, for example, an amorphous compound mainly containing oxide such as tin dioxide, and lithium titanate ($Li_4Ti_5O_2$) are given. Examples of the metal that forms the alloy with metal lithium include aluminum, silicon, tin, and germanium.

It is preferable to use the carbon material with the graphite structure as the negative electrode active material according to the present embodiment, and particularly preferable to use at least one of synthetic graphite and natural graphite.

The negative electrode active material layer according to the present embodiment may contain the carbon material with the graphite structure and may contain other negative electrode active materials with different compositions. Among these, metal or semi-metal that forms alloy with lithium, which is typified by silicon, and alloy thereof exhibit high charging-discharging capacity. Therefore, it is preferable to use these materials and the carbon material with the graphite structure in mixture.

In a case where the negative electrode active material according to the present embodiment contains the negative electrode active material with a composition different from that of the carbon material with the graphite structure, the content of the carbon material with the graphite structure in the total of the carbon material with the graphite structure and the negative electrode active materials with the different compositions is preferably 70.0 mass % or more, more preferably 90.0 mass % or more, and particularly preferably 95.0 mass % or more.

(Negative Electrode Conductive Auxiliary Agent)

Examples of the conductive auxiliary agent include carbon powder of carbon blacks and the like, carbon nanotube, carbon materials, micropowder of metal such as copper, nickel, stainless steel, and iron, a mixture of a carbon material and metal micropowder, and conductive oxide such as ITO. Among these examples, carbon powder of acetylene black, ethylene black, or the like is particularly preferable. In a case where the sufficient conductivity can be achieved merely by the negative electrode active material, the lithium ion secondary battery 100 may exclude the conductive auxiliary agent.

(Binder)

The binder may be similar to the binder that is used for the positive electrode. Other examples of the binder include cellulose, styrene butadiene rubber, ethylene propylene rubber, polyimide resin, polyamide imide resin, and acrylic resin.

The content of the negative electrode active material, the conductive material, and the binder in the negative electrode active material layer 34 is not limited in particular. The constituent ratio of the negative electrode active material in the negative electrode active material layer 34 is preferably 90.0% or more and 98.0% or less in mass ratio. In addition, the constituent ratio of the conductive material in the negative electrode active material layer 34 is preferably 0% or more and 3.0% or less in mass ratio. The constituent ratio of the binder in the negative electrode active material layer 34 is preferably 2.0% or more and 5.0% or less in mass ratio.

When the content of the negative electrode active material and the binder is in the above range, it is possible to suppress that the quantity of binder is too small to form the firm negative electrode active material layer. In addition, it is possible to suppress the tendency that the quantity of binder that does not contribute to the electric capacity increases so as to make it difficult to achieve enough volume energy density.

In addition, when the content of the negative electrode active material and the binder is in the above range, the sufficient electronic conductivity can be achieved in the negative electrode active material layer; thus, the high volume energy density and output characteristic can be achieved.

(Negative Electrode Current Collector)

The negative electrode current collector 32 may be any conductive plate material. Examples of the negative electrode current collector 32 include a metal thin plate of metal such as aluminum, copper, or nickel, and a thin plate of an alloy including any of these metals. Among these examples, the metal thin plate of copper is preferably used.

Note that the negative electrode 30 may exclude the negative electrode active material layer 34. In this case, in the charging, lithium ions are separated out as the metal lithium on the surface of the negative electrode current collector 32. On the other hand, in the discharging, the separated metal lithium is dissolved as lithium ions. In this case, the negative electrode active material layer 34 becomes unnecessary; therefore, the volume energy density of the lithium ion secondary battery can be improved. In that case, a copper foil can be used as the negative electrode current collector 32.

By using the positive electrode 20 and the negative electrode 30 as described above in the lithium ion secondary battery according to the present embodiment, the high charging rate characteristic can be achieved.

(Separator)

The separator 18 may be formed of a porous structure with an electrically insulating property. Examples of the separator 18 include a single-layer body and a multilayer stacked body of films made of polyethylene, polypropylene, and polyolefin, an extension film of a mixture of the above resins, and a fiber nonwoven fabric made of at least one kind of constituent material selected from the group consisting of cellulose, polyester, and polypropylene.

(Nonaqueous Electrolyte Solution)

The nonaqueous electrolyte solution includes a nonaqueous solvent and an electrolyte dissolved in this nonaqueous solvent. The nonaqueous electrolyte solution may contain cyclic carbonate and chain carbonate as the nonaqueous solvent.

The cyclic carbonate may be any cyclic carbonate that can solvate the electrolyte and may be a known cyclic carbonate without particular limitation. Examples of the cyclic carbonate include ethylene carbonate (EC), propylene carbonate (PC), butylene carbonate (BC), and fluoroethylene carbonate (FEC).

The chain carbonate may be any chain carbonate that can decrease the viscosity of the cyclic carbonate, and may be a known chain carbonate without particular limitation. Examples of the chain carbonate include diethyl carbonate (DEC), dimethyl carbonate (DMC), and ethyl methyl carbonate (EMC). Moreover, methyl acetate, ethyl acetate, methyl propionate, ethyl propionate, γ-butyrolactone, 1,2-dimethoxy ethane, 1,2-diethoxy ethane, or the like may be mixed to be used as the chain carbonate.

It is preferable that the nonaqueous solvent according to the present embodiment contains ethylene carbonate and the ethylene carbonate is contained in the range of 10 to 30 vol. % in the entire nonaqueous solvent.

It is estimated that this is because ethylene carbonate, which is partially decomposed on the surface of the electrode to become a film component, is not decomposed excessively and the excellent film can be formed.

The nonaqueous solvent according to the present embodiment preferably contains propylene carbonate. The propylene carbonate is preferably contained in the range of 10 to 20 vol. % in the entire nonaqueous solvent. The ratio of the content Le of the ethylene carbonate to the content Lp of the propylene carbonate, Le/Lp, is preferably in the range of $1.0 \leq Le/Lp \leq 3.0$.

The nonaqueous electrolyte solution according to the present embodiment may be used in combination with a gel electrolyte and/or a solid electrolyte.

Examples of the electrolyte include lithium salt such as $LiPF_6$, $LiClO_4$, $LiBF_4$, $LiCF_3SO_3$, $LiCF_3$, $CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and LiBOB. Any of these lithium salts may be used alone or two or more kinds thereof may be used in combination. In particular, the electrolyte preferably includes $LiPF_6$ from the viewpoint of the conductivity.

When $LiPF_6$ is dissolved in the nonaqueous solvent, it is preferable to control the concentration of the electrolyte in the nonaqueous electrolyte solution to be in the range of 0.5 to 2.0 mol/L. When the concentration of the electrolyte is 0.5 mol/L or more, the conductivity of the nonaqueous electrolyte solution can be sufficiently secured. Thus, sufficient capacity can be achieved easily in the charging and discharging. In addition, when the concentration of the electrolyte is 2.0 mol/L or less, the increase in viscosity of the nonaqueous electrolyte solution can be suppressed; therefore, the mobility of lithium ions can be secured sufficiently. As a result, sufficient capacity can be achieved easily in the charging and discharging.

In the case of mixing $LiPF_6$ with another electrolyte, it is preferable that the lithium ion concentration in the nonaqueous electrolyte solution is 0.5 to 2.0 mol/L, and more preferable that the lithium ion concentration based on $LiPF_6$ is 50 mol % or more.

(Measurement of Reflectance)

The reflectance Ra in the present embodiment can be measured using a commercial spectrophotometer or the like.

The reflectance Ra of the surface of the negative electrode active material layer according to the present embodiment at a wavelength of 550 nm can be controlled by a condition in molding the negative electrode active material layer and a post process after the molding.

Various methods are given as methods of controlling the reflectance. In one example, the reflectance can be varied by changing the pressure and the number of times of pressing the electrode, and the heating condition in the pressing, for example. In another example, the reflectance can be controlled by changing the material and the surface shape of a roll plate and a roller that are used in the pressing.

In still another example, the reflectance can be controlled by polishing the surface of the rolled electrode, or applying top coating on the surface of the rolled electrode. In the case of applying the top coating, it is preferable to use a top coating solution with conductivity in order to suppress the decrease in battery characteristic.

(Manufacturing Method for Positive Electrode 20 and Negative Electrode 30)

Next, description is made of a manufacturing method for the positive electrode 20 and the negative electrode 30 according to the present embodiment.

The binder and the solvent are mixed in the positive electrode active material or the negative electrode active material described above. If necessary, the conductive auxiliary agent may be added. The solvent may be, for example, water and N-methyl-2-pyrrolidone. A method of mixing the component of the coating is not limited to a particular method, and a mixing order is not limited either to a particular order. The coating is applied to the current collectors 22 and 32. The coating method is not limited to a particular method and may be a method that is usually employed to manufacture the electrode. Examples of the coating method include a slit die coating method and a doctor blade method.

Subsequently, the solvent is removed from the coating applied on the current collectors 22 and 32. The removing method is not limited to a particular method. For example, the current collectors 22 and 32 where the coating is applied may be dried in an atmosphere of 80 to 150° C.

The electrode where the positive electrode active material layer 24 is formed and the electrode where the negative electrode active material layer 34 is formed are subjected to a pressing process by a roll pressing device as necessary. By adjusting the pressure, the number of times of pressing, and the shape of the press material of the pressing device in this process, the reflectance of the surface of each of the positive electrode active material layer 24 and the negative electrode active material layer 34 can be controlled.

Through this process, the positive electrode 20 where the positive electrode active material layer 24 is formed on the positive electrode current collector 22 and the negative electrode 30 where the negative electrode active material layer 34 is formed on the negative electrode current collector 32 are obtained.

(Manufacturing Method for Lithium Ion Secondary Battery)

Subsequently, description is made of a manufacturing method for a lithium ion secondary battery according to the present embodiment. The manufacturing method for a lithium ion secondary battery according to the present embodiment includes a step of sealing in the package 50, the positive electrode 20 including the positive electrode active material, the negative electrode 30 including the negative electrode active material, the separator 10 interposed between the positive electrode and the negative electrode, and the nonaqueous electrolyte solution containing lithium salt.

For example, the positive electrode 20 including the positive electrode active material described above, the negative electrode 30, and the separator 10 are stacked. By heating and pressurizing the positive electrode 20 and the negative electrode 30 from a direction perpendicular to the stacking direction with the use of a pressing machine, the positive electrode 20, the separator 10, and the negative electrode 30 are disposed in close contact. Into the package 50 with a bag shape, which is manufactured in advance, for example, the stacked body 40 is put and the nonaqueous electrolyte solution containing the lithium salt is poured. Thus, the lithium ion secondary battery can be manufactured. Instead of pouring the nonaqueous electrolyte solution containing the lithium salt into the package, the stacked body 40 may be impregnated with the nonaqueous electrolyte solution containing the lithium salt.

The present disclosure is not limited to the embodiment described above. The embodiment described above is the mere example and any subject that has the structure substantially the same as the technical concept described in the scope of claims and exerts the similar operation effect is incorporated in the technical range of the present disclosure.

The embodiment according to the present disclosure has been described in detail. However, the technique according to the present disclosure is not limited to the embodiment described above, and various modifications are possible. For example, the above embodiment has described the laminate film type lithium ion secondary battery; however, the present disclosure is not limited to this example and the technique according to the present disclosure is similarly applicable to a lithium ion secondary battery in which the positive electrode, the negative electrode, and the separator is wound or folded. In addition, the technique according to the present disclosure is suitably applicable to a lithium ion secondary battery with a cylindrical, rectangular, or coin shape.

EXAMPLES

The technique according to the present disclosure will hereinafter be described in more detail with reference to Examples and Comparative examples.

Example 1

(Manufacture of Negative Electrode)

The following components were weighed: 90 parts by weight of graphite powder as the negative electrode active material, 2.5 parts by weight of styrene butadiene rubber as the binder, 1.5 parts by weight of carboxymethyl cellulose as a thickener, and 6.0 parts by weight of carbon black (Super-P) as the conductive auxiliary agent. These components were diffused in water; thus, slurry was prepared. The prepared slurry was applied on a 15-μm-thick copper foil and dried at 120° C. for 30 minutes, so that the solvent was removed. After that, the copper foil was pressed with a linear pressure of 700 kgf/cm using a roll pressing machine in which a roll for pressing was heated at 82° C. The pressing was followed by air-cooling, and this process is regarded as one cycle of pressing process; here, three cycles of the pressing process were performed.

The pressed copper foil was punched into an electrode size of 18 mm×22 mm using a die, and thus, the negative electrode for a lithium ion secondary battery was manufactured.

The reflectance Ra of the surface of the negative electrode active material layer in the negative electrode obtained in this manner at a wavelength of 550 nm was measured using the spectrophotometer (made by Konica Minolta, Inc., SPECTRO PHOTOMETER CM-5). The result indicates that Ra was 7.0%.

The obtained negative electrode was cut into a square of 10 cm$^2$, and the density da, the supporting quantity La per unit area, and the porosity Pa of the negative electrode active material layer were calculated. The results indicate that da=1.51 g/cm$^3$, La=9.5 mg/cm$^2$, and Pa=28.5%.

(Manufacture of Counter Electrode)

On a copper foil that is punched into an electrode size of 19 mm×23 mm using a die, a metal lithium foil was crimped, so that a counter electrode was manufactured.

(Nonaqueous Electrolyte Solution)

The nonaqueous electrolyte solution was prepared by dissolving LiPF$_6$ as the electrolyte at 1.3 mol/L in the nonaqueous solvent in which ethylene carbonate (EC), propylene carbonate (PC), and ethyl methyl carbonate (EMC) were mixed. The volume ratio among EC, PC, and EMC in the nonaqueous solvent was EC:PC:EMC=10:10:80.

(Separator)

As the separator, a polyethylene microporous film with a thickness of 20 μm (porosity: 40%, shutdown temperature: 134° C.) was prepared.

(Manufacture of Battery Cell)

The negative electrode and the counter electrode were stacked with a separator made of polyethylene interposed therebetween; thus, an electrode stacked body was manufactured. This is treated as "one layer of electrode body", and through the similar manufacturing method, an electrode stacked body including four layers of electrode bodies was manufactured. Note that the negative electrode and the counter electrode include a mixed layer on each surface. Therefore, the electrode stacked body includes three negative electrodes, two counter electrodes, and four separators. In the negative electrode of the electrode stacked body, a negative electrode lead made of nickel was attached to a projecting end part of the copper foil where the negative electrode mixed layer was not provided. On the other hand, in the counter electrode of the electrode stacked body, a counter electrode lead made of nickel was attached using an ultrasonic welding machine to a projecting end part of the copper foil where the metal lithium foil was not crimped. This negative electrode lead and the counter electrode lead were welded to an aluminum laminate film for a package, and by folding the laminate film, the electrode stacked body was inserted into the package. The periphery of the package was heat sealed except one side, so that an opening was provided to the package. Through this opening, a nonaqueous electrolyte solution was poured into the package. After that, the opening of the package was heat sealed while the pressure was reduced by a vacuum sealing machine. Thus, a battery cell of a laminate type according to Example 1 was manufactured. Note that the battery cell was manufactured in a dry room.

Example 2

A battery cell according to Example 2 was manufactured by the same method as that of Example 1 except that the roll for pressing in the pressing process was heated at 88° C. in the manufacture of the negative electrode.

Example 3

A battery cell according to Example 3 was manufactured by the same method as that of Example 1 except that the roll for pressing in the pressing process was heated at 91° C. in the manufacture of the negative electrode.

Example 4

A battery cell according to Example 4 was manufactured by the same method as that of Example 1 except that the roll for pressing in the pressing process was heated at 97° C. in the manufacture of the negative electrode.

Example 5

A battery cell according to Example 5 was manufactured by the same method as that of Example 1 except that the roll for pressing in the pressing process was set to 105° C. in the manufacture of the negative electrode.

Example 6

A battery cell according to Example 6 was manufactured by the same method as that of Example 1 except that the roll for pressing in the pressing process was heated at 105° C. and the number of times of pressing was set to five cycles in the manufacture of the negative electrode.

Example 7

A battery cell according to Example 7 was manufactured by the same method as that of Example 1 except that the roll for pressing in the pressing process was heated at 111° C. and the number of times of pressing was set to three cycles in the manufacture of the negative electrode.

Example 8

A battery cell according to Example 8 was manufactured by the same method as that of Example 3 except that the linear pressure in the pressing process was set to 450 kgf/cm in the manufacture of the negative electrode.

Example 9

A battery cell according to Example 9 was manufactured by the same method as that of Example 3 except that the linear pressure in the pressing process was set to 510 kgf/cm in the manufacture of the negative electrode.

Example 10

A battery cell according to Example 10 was manufactured by the same method as that of Example 3 except that the linear pressure in the pressing process was set to 670 kgf/cm in the manufacture of the negative electrode.

Example 11

A battery cell according to Example 11 was manufactured by the same method as that of Example 3 except that the linear pressure in the pressing process was set to 800 kgf/cm in the manufacture of the negative electrode.

Example 12

A battery cell according to Example 12 was manufactured by the same method as that of Example 3 except that the linear pressure in the pressing process was set to 1000 kgf/cm in the manufacture of the negative electrode.

Example 13

A battery cell according to Example 13 was manufactured by the same method as that of Example 3 except that the quantity of slurry that was applied was adjusted so that the supporting quantity La per unit area became 4.0 mg/cm$^2$ in the manufacture of the negative electrode. The result of measurement indicates that the supporting quantity La of the manufactured negative electrode per unit area was 4.2 mg/cm$^2$.

Example 14

A battery cell according to Example 14 was manufactured by the same method as that of Example 3 except that the quantity of slurry that was applied was adjusted so that the supporting quantity La per unit area became 4.5 mg/cm$^2$ in the manufacture of the negative electrode. The result of measurement indicates that the supporting quantity La of the manufactured negative electrode per unit area was 4.5 mg/cm$^2$.

Example 15

A battery cell according to Example 15 was manufactured by the same method as that of Example 3 except that the quantity of slurry that was applied was adjusted so that the supporting quantity La per unit area became 7.5 mg/cm$^2$ in the manufacture of the negative electrode. The result of measurement indicates that the supporting quantity La of the manufactured negative electrode per unit area was 7.8 mg/cm$^2$.

Example 16

A battery cell according to Example 16 was manufactured by the same method as that of Example 3 except that the quantity of slurry that was applied was adjusted so that the supporting quantity La per unit area became 8.0 mg/cm$^2$ in the manufacture of the negative electrode. The result of measurement indicates that the supporting quantity La of the manufactured negative electrode per unit area was 8.0 mg/cm$^2$.

Example 17

A battery cell according to Example 17 was manufactured by the same method as that of Example 3 except that the quantity of slurry that was applied was adjusted so that the supporting quantity La per unit area became 12.0 mg/cm$^2$ in the manufacture of the negative electrode. The result of measurement indicates that the supporting quantity La of the manufactured negative electrode per unit area was 11.9 mg/cm².

Example 18

A battery cell according to Example 18 was manufactured by the same method as that of Example 3 except that the quantity of slurry that was applied was adjusted so that the supporting quantity La per unit area became 12.5 mg/cm² in the manufacture of the negative electrode. The result of measurement indicates that the supporting quantity La of the manufactured negative electrode per unit area was 12.5 mg/cm².

Example 19

A battery cell according to Example 19 was manufactured by the same method as that of Example 3 except that the quantity of slurry that was applied was adjusted so that the supporting quantity La per unit area became 13.0 mg/cm² in the manufacture of the negative electrode. The result of measurement indicates that the supporting quantity La of the manufactured negative electrode per unit area was 12.9 mg/cm².

Example 20

A battery cell according to Example 20 was manufactured by the same method as that of Example 1 except that a mixture of 20 parts by weight of graphite powder and 80 parts by weight of silicon oxide was used as the negative electrode active material in the manufacture of the negative electrode.

Example 21

A battery cell according to Example 21 was manufactured by the same method as that of Example 2 except that a mixture of 20 parts by weight of graphite powder and 80 parts by weight of silicon oxide was used as the negative electrode active material in the manufacture of the negative electrode.

Example 22

A battery cell according to Example 22 was manufactured by the same method as that of Example 3 except that a mixture of 20 parts by weight of graphite powder and 80 parts by weight of silicon oxide was used as the negative electrode active material in the manufacture of the negative electrode.

Example 23

A battery cell according to Example 23 was manufactured by the same method as that of Example 4 except that a mixture of 20 parts by weight of graphite powder and 80 parts by weight of silicon oxide was used as the negative electrode active material in the manufacture of the negative electrode.

Example 24

A battery cell according to Example 24 was manufactured by the same method as that of Example 5 except that a mixture of 20 parts by weight of graphite powder and 80 parts by weight of silicon oxide was used as the negative electrode active material in the manufacture of the negative electrode.

Example 25

A battery cell according to Example 25 was manufactured by the same method as that of Example 6 except that a mixture of 20 parts by weight of graphite powder and 80 parts by weight of silicon oxide was used as the negative electrode active material in the manufacture of the negative electrode.

Example 26

A battery cell according to Example 26 was manufactured by the same method as that of Example 7 except that a mixture of 20 parts by weight of graphite powder and 80 parts by weight of silicon oxide was used as the negative electrode active material in the manufacture of the negative electrode.

Comparative Example 1

A battery cell according to Comparative example 1 was manufactured by the same method as that of Example 1 except that the roll for pressing in the pressing process was heated at 76° C. in the manufacture of the negative electrode.

Comparative Example 2

A battery cell according to Comparative example 2 was manufactured by the same method as that of Example 1 except that the roll for pressing in the pressing process was heated at 111° C. and the number of times of pressing was set to five cycles in the manufacture of the negative electrode.

Comparative Example 3

A battery cell according to Comparative example 3 was manufactured by the same method as that of Comparative example 1 except that a mixture of 20 parts by weight of graphite powder and 80 parts by weight of silicon oxide was used as the negative electrode active material in the manufacture of the negative electrode.

Comparative Example 4

A battery cell according to Comparative example 4 was manufactured by the same method as that of Comparative example 2 except that a mixture of 20 parts by weight of graphite powder and 80 parts by weight of silicon oxide was used as the negative electrode active material in the manufacture of the negative electrode.

(Manufacture of Positive Electrode)

The following components were weighed: 88.0 parts by weight of LiFePO₄ as the positive electrode active material, 6.0 parts by weight of PVDF (HSV-800) as the binder, and 6.0 parts by weight of Ketjen black (ECP300J) as the conductive auxiliary agent. These components were diffused in N-methyl-2-pyrrolidone (NMP) as the solvent; thus, slurry was prepared. The obtained slurry was applied on a 15-μm-thick aluminum foil and dried at 120° C. for 30 minutes, so that the solvent was removed. After that, the aluminum foil was pressed with a linear pressure of 2000 kgf/cm using a roll pressing machine.

The pressed aluminum foil was punched into an electrode size of 18 mm×22 mm using a die, and thus, the positive electrode for evaluation was manufactured.

Example 27

A battery cell according to Example 27 was manufactured by the same method as that of Example 1 except that the counter electrode was replaced by a positive electrode for evaluation and the counter electrode lead made of nickel was replaced by a positive electrode lead made of aluminum.

Example 28

A battery cell according to Example 28 was manufactured by the same method as that of Example 2 except that the counter electrode was replaced by a positive electrode for evaluation and the counter electrode lead made of nickel was replaced by a positive electrode lead made of aluminum.

Example 29

A battery cell according to Example 29 was manufactured by the same method as that of Example 3 except that the counter electrode was replaced by a positive electrode for evaluation and the counter electrode lead made of nickel was replaced by a positive electrode lead made of aluminum.

Example 30

A battery cell according to Example 30 was manufactured by the same method as that of Example 4 except that the counter electrode was replaced by a positive electrode for evaluation and the counter electrode lead made of nickel was replaced by a positive electrode lead made of aluminum.

Example 31

A battery cell according to Example 31 was manufactured by the same method as that of Example 5 except that the counter electrode was replaced by a positive electrode for evaluation and the counter electrode lead made of nickel was replaced by a positive electrode lead made of aluminum.

Example 32

A battery cell according to Example 32 was manufactured by the same method as that of Example 6 except that the counter electrode was replaced by a positive electrode for evaluation and the counter electrode lead made of nickel was replaced by a positive electrode lead made of aluminum.

Example 33

A battery cell according to Example 33 was manufactured by the same method as that of Example 7 except that the counter electrode was replaced by a positive electrode for evaluation and the counter electrode lead made of nickel was replaced by a positive electrode lead made of aluminum.

Example 34

A battery cell according to Example 34 was manufactured by the same method as that of Example 20 except that the counter electrode was replaced by a positive electrode for evaluation and the counter electrode lead made of nickel was replaced by a positive electrode lead made of aluminum.

Example 35

A battery cell according to Example 35 was manufactured by the same method as that of Example 21 except that the counter electrode was replaced by a positive electrode for evaluation and the counter electrode lead made of nickel was replaced by a positive electrode lead made of aluminum.

Example 36

A battery cell according to Example 36 was manufactured by the same method as that of Example 22 except that the counter electrode was replaced by a positive electrode for evaluation and the counter electrode lead made of nickel was replaced by a positive electrode lead made of aluminum.

Example 37

A battery cell according to Example 37 was manufactured by the same method as that of Example 23 except that the counter electrode was replaced by a positive electrode for evaluation and the counter electrode lead made of nickel was replaced by a positive electrode lead made of aluminum.

Example 38

A battery cell according to Example 38 was manufactured by the same method as that of Example 24 except that the counter electrode was replaced by a positive electrode for evaluation and the counter electrode lead made of nickel was replaced by a positive electrode lead made of aluminum.

Example 39

A battery cell according to Example 39 was manufactured by the same method as that of Example 25 except that the counter electrode was replaced by a positive electrode for evaluation and the counter electrode lead made of nickel was replaced by a positive electrode lead made of aluminum.

Example 40

A battery cell according to Example 40 was manufactured by the same method as that of Example 26 except that the counter electrode was replaced by a positive electrode for evaluation and the counter electrode lead made of nickel was replaced by a positive electrode lead made of aluminum.

Comparative Example 5

A battery cell according to Comparative example 5 was manufactured by the same method as that of Comparative example 1 except that the counter electrode was replaced by a positive electrode for evaluation and the counter electrode lead made of nickel was replaced by a positive electrode lead made of aluminum.

Comparative Example 6

A battery cell according to Comparative example 6 was manufactured by the same method as that of Comparative example 2 except that the counter electrode was replaced by a positive electrode for evaluation and the counter electrode lead made of nickel was replaced by a positive electrode lead made of aluminum.

Comparative Example 7

A battery cell according to Comparative example 7 was manufactured by the same method as that of Comparative example 3 except that the counter electrode was replaced by a positive electrode for evaluation and the counter electrode lead made of nickel was replaced by a positive electrode lead made of aluminum.

Comparative Example 8

A battery cell according to Comparative example 8 was manufactured by the same method as that of Comparative example 4 except that the counter electrode was replaced by a positive electrode for evaluation and the counter electrode lead made of nickel was replaced by a positive electrode lead made of aluminum.

In regard to the negative electrodes used in Examples 2 to 40 and Comparative examples 1 to 8, the reflectance Ra of the surface of the negative electrode active material layer at a wavelength of 550 nm was measured using the same method as that of Example 1. The density da, the supporting quantity La per unit area, and the porosity Pa of the negative electrode active material layer were also measured using the same method as that of Example 1. The results in Examples 2 to 26 and Comparative examples 1 to 4 are shown in Table 1 together with the results in Example 1. In addition, the results in Examples 27 to 40 and Comparative examples 5 to 8 are shown in Table 2.

Example 41

A battery cell according to Example 41 was manufactured by the same method as that of Example 3 except that a mixture containing EC, PC, and EMC at a volume ratio of EC:PC:EMC=20:10:70 was used as the nonaqueous solvent of the nonaqueous electrolyte solution.

Example 42

A battery cell according to Example 42 was manufactured by the same method as that of Example 3 except that a mixture containing EC, PC, and EMC at a volume ratio of EC:PC:EMC=30:10:60 was used as the nonaqueous solvent of the nonaqueous electrolyte solution.

Example 43

A battery cell according to Example 43 was manufactured by the same method as that of Example 3 except that a mixture containing EC, PC, and EMC at a volume ratio of EC:PC:EMC=20:20:60 was used as the nonaqueous solvent of the nonaqueous electrolyte solution.

Example 44

A battery cell according to Example 44 was manufactured by the same method as that of Example 3 except that a mixture containing EC and EMC at a volume ratio of EC:EMC=30:70 was used as the nonaqueous solvent of the nonaqueous electrolyte solution.

Example 45

A battery cell according to Example 45 was manufactured by the same method as that of Example 3 except that a mixture containing EC and EMC at a volume ratio of EC:EMC=20:80 was used as the nonaqueous solvent of the nonaqueous electrolyte solution.

Example 46

A battery cell according to Example 46 was manufactured by the same method as that of Example 3 except that a mixture containing EC and EMC at a volume ratio of EC:EMC=10:90 was used as the nonaqueous solvent of the nonaqueous electrolyte solution.

Example 47

A battery cell according to Example 47 was manufactured by the same method as that of Example 3 except that a mixture containing EC, PC, and EMC at a volume ratio of EC:PC:EMC=40:10:50 was used as the nonaqueous solvent of the nonaqueous electrolyte solution.

Example 48

A battery cell according to Example 48 was manufactured by the same method as that of Example 3 except that a mixture containing FEC, PC, and EMC at a volume ratio of FEC:PC:EMC=10:10:80 was used as the nonaqueous solvent of the nonaqueous electrolyte solution.

The nonaqueous solvents used in Examples 41 to 48 were analyzed by gas chromatography-mass spectrometry. The results have proved that the composition of the nonaqueous solvent was equivalent to that of the preparation. The ratio of the content Le of the ethylene carbonate to the content Lp of the propylene carbonate in the nonaqueous solvent obtained by the gas chromatography-mass spectrometry, Le/Lp, is shown in Table 2.

(Measurement of Rapid Charging Characteristic)

The battery cell manufactured in accordance with Example 1 was charged at constant current with a current density of 0.1 C until the battery reached 2.5 V (vs. Li/Li$^+$). In addition, the battery cell was charged at constant voltage at 2.5 V (vs. Li/Li$^+$) until the current density decreased to 0.05 C. After a rest for five minutes, the battery cell was discharged at constant current with a current density of 0.1 C until the voltage became 0.05 V (vs. Li/Li$^+$). This is how the initial charging and discharging were performed.

After the initial charging, the constant-current charging was performed with a current density of 0.2 C until the voltage became 2.5 V (vs. Li/Li$^+$). Furthermore, the constant-voltage charging was performed at 2.5 V (vs. Li/Li$^+$) until the current density decreased to 0.05 C. After that, the charging capacity at 0.2 C was measured.

After the charging capacity at 0.2 C was measured, the battery cell was left at rest for five minutes. Then, the constant-current discharging was performed with a current density of 0.1 C until the voltage became 0.01 V (vs. Li/Li$^+$). In this manner, the battery cell was discharged.

For the discharged battery cell, the constant-current charging was performed with a current density of 2.0 C until the voltage became 2.5 V (vs. Li/Li$^+$). In addition, the constant-voltage charging was performed at 2.5 V (vs. Li/Li$^+$) until the current density decreased to 0.05 C. After that, the initial charging capacity at 2.0 C was measured.

After the initial charging capacity at 2.0 C was measured, the constant-current discharging was performed with a current density of 0.5 C until the voltage became 0.05 V (vs. Li/Li$^+$). After that, the constant-current charging was performed with a current density of 2.0 C until the voltage became 2.5 V (vs. Li/Li⁺). Furthermore, the constant-voltage charging was performed at 2.5 V (vs. Li/Li⁺) with a current density of 2.0 C until the current density decreased to 0.05 C. Regarding these three constant-current discharging processes as one cycle, the charging capacity after 100 cycles at 2.0 C was measured.

The ratio of the charging capacity after 100 cycles at 2.0 C to the initial charging capacity at 2.0 C, which was regarded as the rapid charging characteristic, was calculated by the following expression (1), and the rapid charging characteristic was evaluated.

Rapid charging characteristic (%)=(initial charging capacity at 2.0 C/charging capacity after 100 cycles at 2.0 C)×100    (1)

The rapid charging characteristic of the battery cells in Examples 2 to 26 and 41 to 48, and Comparative examples 1 and 2 was evaluated in accordance with the same method as that of the battery cell in Example 1.

The rapid charging characteristic of the battery cells in Examples 27 to 40 and Comparative examples 3 and 4 was evaluated by the same method as that of the battery cell in Example 1 except that the voltage in the constant-current charging and the constant-voltage charging was changed to 4.0 V (vs. Li/Li⁺) and the voltage in the constant-current discharging was changed to 2.5 V (vs. Li/Li⁺).

The results of the rapid charging characteristic of the battery cells in Examples 1 to 26 and Comparative examples 1 and 2 are shown in Table 1. The results of the rapid charging characteristic of the battery cells in Examples 27 to 40 and Comparative examples 3 and 4 are shown in Table 2. In addition, the results of the rapid charging characteristic of the battery cells in Examples 41 to 48 are shown in Table 3.

As shown by the results in Examples 1 to 7 and Comparative examples 1 and 2 in Table 1, it has been confirmed that the rapid charging characteristic was improved largely by the use of the negative electrode in which the reflectance Ra of the surface of the negative electrode active material layer at a wavelength of 550 nm is in the range of 7.0≤Ra≤14.8%. In addition, as shown by the results in Examples 8 to 19, the density da of the negative electrode active material layer, the supporting quantity La of the negative electrode active material layer, and the porosity Pa of the negative electrode active material layer contribute to the rapid charging characteristic. The rapid charging characteristic is particularly improved when each of these is in the particular range.

In addition, as shown by the results in Examples 20 to 26 and Comparative examples 3 and 4, it has been confirmed that even when the mixture of graphite and silicon oxide was used as the negative electrode active material, similarly, the rapid charging characteristic was improved largely by the use of the negative electrode in which the reflectance Ra of the surface of the negative electrode active material layer at a wavelength of 550 nm is in the range of 7.0≤Ra≤14.8%.

After the rapid charging characteristic of the battery cells in Examples 1 to 26 and Comparative examples 1 to 4 was evaluated, each battery cell was disassembled in a glove box with an argon atmosphere, and then the negative electrode was extracted. The extracted negative electrode was cleaned using dimethyl carbonate and dried. After the drying, the reflectance Ra of the surface of the negative electrode active material layer at a wavelength of 550 nm was measured. As a result, it has been confirmed that the reflectance Ra of each battery cell remained the same before and after the evaluation.

TABLE 1

| | Negative electrode active material | Counter electrode | Ra (%) | da (g/cm³) | La (mg/cm²) | Pa (%) | Quick charging characteristic (%) |
|---|---|---|---|---|---|---|---|
| Example 1 | Graphite | Metal lithium foil | 7.0 | 1.51 | 9.5 | 28.5 | 83 |
| Example 2 | Graphite | Metal lithium foil | 7.8 | 1.51 | 9.5 | 28.5 | 88 |
| Example 3 | Graphite | Metal lithium foil | 8.5 | 1.51 | 9.5 | 28.5 | 93 |
| Example 4 | Graphite | Metal lithium foil | 9.7 | 1.51 | 9.5 | 28.5 | 92 |
| Example 5 | Graphite | Metal lithium foil | 10.0 | 1.51 | 9.5 | 28.5 | 95 |
| Example 6 | Graphite | Metal lithium foil | 12.4 | 1.51 | 9.5 | 28.5 | 88 |
| Example 7 | Graphite | Metal lithium foil | 14.8 | 1.51 | 9.5 | 28.5 | 85 |
| Example 8 | Graphite | Metal lithium foil | 8.5 | 1.35 | 9.5 | 31.3 | 86 |
| Example 9 | Graphite | Metal lithium foil | 8.5 | 1.40 | 9.5 | 30.1 | 93 |
| Example 10 | Graphite | Metal lithium foil | 8.5 | 1.48 | 9.5 | 28.8 | 95 |
| Example 11 | Graphite | Metal lithium foil | 8.5 | 1.60 | 9.5 | 27.3 | 93 |
| Example 12 | Graphite | Metal lithium foil | 8.5 | 1.62 | 9.5 | 26.5 | 83 |
| Example 13 | Graphite | Metal lithium foil | 8.5 | 1.51 | 4.2 | 28.5 | 80 |
| Example 14 | Graphite | Metal lithium foil | 8.5 | 1.51 | 4.5 | 28.5 | 86 |
| Example 15 | Graphite | Metal lithium foil | 8.5 | 1.51 | 7.8 | 28.5 | 85 |
| Example 16 | Graphite | Metal lithium foil | 8.5 | 1.51 | 8.0 | 28.5 | 92 |
| Example 17 | Graphite | Metal lithium foil | 8.5 | 1.51 | 11.9 | 28.5 | 93 |
| Example 18 | Graphite | Metal lithium foil | 8.5 | 1.51 | 12.5 | 28.5 | 87 |
| Example 19 | Graphite | Metal lithium foil | 8.5 | 1.51 | 12.9 | 28.5 | 83 |
| Example 20 | Graphite + silicon oxide | Metal lithium foil | 7.0 | 1.51 | 9.5 | 28.5 | 88 |
| Example 21 | Graphite + silicon oxide | Metal lithium foil | 7.8 | 1.51 | 9.5 | 28.5 | 88 |
| Example 22 | Graphite + silicon oxide | Metal lithium foil | 8.5 | 1.51 | 9.5 | 28.5 | 95 |
| Example 23 | Graphite + silicon oxide | Metal lithium foil | 9.7 | 1.51 | 9.5 | 28.5 | 94 |
| Example 24 | Graphite + silicon oxide | Metal lithium foil | 10.0 | 1.51 | 9.5 | 28.5 | 90 |
| Example 25 | Graphite + silicon oxide | Metal lithium foil | 12.4 | 1.51 | 9.5 | 28.5 | 85 |
| Example 26 | Graphite + silicon oxide | Metal lithium foil | 14.8 | 1.51 | 9.5 | 28.5 | 86 |
| Comparative example 1 | Graphite | Metal lithium foil | 6.8 | 1.51 | 9.5 | 28.5 | 73 |
| Comparative example 2 | Graphite | Metal lithium foil | 15.0 | 1.51 | 9.5 | 28.5 | 74 |
| Comparative example 3 | Graphite + silicon oxide | Metal lithium foil | 6.8 | 1.51 | 9.5 | 28.5 | 70 |
| Comparative example 4 | Graphite + silicon oxide | Metal lithium foil | 15.0 | 1.51 | 9.5 | 28.5 | 71 |

TABLE 2

| | Negative electrode active material | Positive electrode active material | Ra (%) | da (g/cm³) | La (mg/cm²) | Pa (%) | Quick charging characteristic (%) |
|---|---|---|---|---|---|---|---|
| Example 27 | Graphite | LiFePO$_4$ | 7.0 | 1.51 | 9.5 | 28.5 | 77 |
| Example 28 | Graphite | LiFePO$_4$ | 7.8 | 1.51 | 9.5 | 28.5 | 85 |
| Example 29 | Graphite | LiFePO$_4$ | 8.5 | 1.51 | 9.5 | 28.5 | 88 |
| Example 30 | Graphite | LiFePO$_4$ | 9.7 | 1.51 | 9.5 | 28.5 | 87 |
| Example 31 | Graphite | LiFePO$_4$ | 10.0 | 1.51 | 9.5 | 28.5 | 89 |
| Example 32 | Graphite | LiFePO$_4$ | 12.4 | 1.51 | 9.5 | 28.5 | 79 |
| Example 33 | Graphite | LiFePO$_4$ | 14.8 | 1.51 | 9.5 | 28.5 | 80 |
| Example 34 | Graphite + silicon oxide | LiFePO$_4$ | 7.0 | 1.51 | 9.5 | 28.5 | 83 |
| Example 35 | Graphite + silicon oxide | LiFePO$_4$ | 7.8 | 1.51 | 9.5 | 28.5 | 88 |
| Example 36 | Graphite + silicon oxide | LiFePO$_4$ | 8.5 | 1.51 | 9.5 | 28.5 | 90 |
| Example 37 | Graphite + silicon oxide | LiFePO$_4$ | 9.7 | 1.51 | 9.5 | 28.5 | 91 |
| Example 38 | Graphite + silicon oxide | LiFePO$_4$ | 10.0 | 1.51 | 9.5 | 28.5 | 90 |
| Example 39 | Graphite + silicon oxide | LiFePO$_4$ | 12.4 | 1.51 | 9.5 | 28.5 | 84 |
| Example 40 | Graphite + silicon oxide | LiFePO$_4$ | 14.8 | 1.51 | 9.5 | 28.5 | 82 |
| Comparative example 5 | Graphite | LiFePO$_4$ | 6.8 | 1.51 | 9.5 | 28.5 | 70 |
| Comparative example 6 | Graphite | LiFePO$_4$ | 15.1 | 1.51 | 9.5 | 28.5 | 69 |
| Comparative example 7 | Graphite + silicon oxide | LiFePO$_4$ | 6.8 | 1.51 | 9.5 | 28.5 | 68 |
| Comparative example 8 | Graphite + silicon oxide | LiFePO$_4$ | 15.0 | 1.51 | 9.5 | 28.5 | 66 |

In Table 2, as shown by the results in Examples 27 to 33 and Comparative examples 5 and 6, even in the evaluation of the battery cell including the general positive electrode instead of the counter electrode, it has been confirmed that the rapid charging characteristic was improved largely by the use of the negative electrode in which the reflectance Ra of the surface of the negative electrode active material layer at a wavelength of 550 nm is in the range of 7.0≤Ra≤14.8%. In addition, as shown by the results in Examples 34 to 40 and Comparative examples 7 and 8, even when the mixture of graphite and silicon oxide was used as the negative electrode active material, similarly, it has been confirmed that the rapid charging characteristic was improved largely. That is to say, it has been confirmed that the improvement of the rapid charging characteristic according to the present embodiment is the effect resulting from the use of the particular negative electrode.

After the rapid charging characteristic of the battery cells in Examples 27 to 40 and Comparative examples 5 to 8 was evaluated, each battery cell was disassembled in a glove box with an argon atmosphere, and then the negative electrode was extracted. The extracted negative electrode was cleaned using dimethyl carbonate and dried. After the drying, the reflectance Ra of the surface of the negative electrode active material layer at a wavelength of 550 nm was measured. As a result, it has been confirmed that the reflectance Ra of each battery cell remained the same before and after the evaluation.

TABLE 3

| | Negative electrode active material | Nonaqueous solvent composition | Le/Lp | Quick charging characteristic (%) |
|---|---|---|---|---|
| Example 41 | Graphite | EC:PC:EMC = 2:1:7 | 2.0 | 95 |
| Example 42 | Graphite | EC:PC:EMC = 3:1:6 | 3.0 | 93 |
| Example 43 | Graphite | EC:PC:EMC = 2:2:6 | 1.0 | 92 |
| Example 44 | Graphite | EC:EMC = 3:7 | — | 87 |
| Example 45 | Graphite | EC:EMC = 2:8 | — | 88 |
| Example 46 | Graphite | EC:EMC = 1:9 | — | 89 |
| Example 47 | Graphite | EC:PC:EMC = 4:1:5 | 4.0 | 81 |
| Example 48 | Graphite | FEC:PC:EMC = 1:1:8 | — | 84 |

As shown in Table 3, it is understood that the rapid charging characteristic is high when the nonaqueous solvent contains ethylene carbonate (EC) and the volume ratio of ethylene carbonate in the nonaqueous solvent is in the range of 10 to 30 vol. %.

In addition, it is understood that the rapid charging characteristic is improved particularly when the nonaqueous solvent contains propylene carbonate (PC) and the ratio of the content Le of ethylene carbonate to the content Lp of propylene carbonate, Le/Lp, is in the range of 1≤Le/Lp≤3.

According to the present embodiment, the negative electrode that can improve the rapid charging characteristic, and the lithium ion secondary battery including this negative electrode can be provided. These negative electrode and lithium ion secondary battery can be suitably used as the power source of the mobile electronic devices. Furthermore, these negative electrode and lithium ion secondary battery can be used in electric vehicles, or for home-use storage batteries and industrial storage batteries.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A negative electrode comprising a negative electrode current collector and a negative electrode active material layer that is provided on the negative electrode current collector and includes a negative electrode active material, wherein:
   the negative electrode active material includes a carbon material; and
   a surface of the negative electrode active material layer has a spectral reflectance Ra in a range of 7.0≤Ra≤14.8% at a wavelength of 550 nm.

2. The negative electrode according to claim 1, wherein the carbon material contains a carbon material with a graphite structure.

3. The negative electrode according to claim 1, wherein the negative electrode active material layer has a density da in a range of $1.35 \leq da \leq 1.62$ g/cm$^3$.

4. The negative electrode according to claim 1, wherein the negative electrode active material layer has a porosity Pa in a range of $26.5 \leq Pa \leq 31.3\%$.

5. The negative electrode according to claim 1, wherein the negative electrode active material layer has a supporting quantity La per unit area in a range of $4.5 \leq La \leq 12.5$ mg/cm$^2$.

6. A lithium ion secondary battery comprising the negative electrode according to claim 1, a positive electrode, a separator, and a nonaqueous electrolyte solution, wherein:
   the nonaqueous electrolyte solution includes a nonaqueous solvent and an electrolyte;
   the nonaqueous solvent contains ethylene carbonate; and
   the ethylene carbonate is contained in a range of 10 to 30 vol. % in the entire nonaqueous solvent.

7. The lithium ion secondary battery according to claim 6, wherein:
   the nonaqueous solvent contains propylene carbonate;
   the propylene carbonate is contained in a range of 10 to 20 vol. % in the entire nonaqueous solvent; and
   a ratio of a content Le of the ethylene carbonate to a content Lp of the propylene carbonate, Le/Lp, is in a range of $1.0 \leq Le/Lp \leq 3.0$.

\* \* \* \* \*